(12) United States Patent
Yanase et al.

(10) Patent No.: US 6,429,613 B2
(45) Date of Patent: Aug. 6, 2002

(54) GENERATION CONTROL DEVICE OF HYBRID ELECTRIC VEHICLE

(75) Inventors: Takashi Yanase; Makoto Ogata, both of Kanagawa (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/790,659

(22) Filed: Feb. 23, 2001

(30) Foreign Application Priority Data

Feb. 24, 2000 (JP) ........................................ 2000-047433

(51) Int. Cl.[7] .............................................. H02P 5/00
(52) U.S. Cl. ....................... 318/139; 318/138; 318/140; 318/153; 180/65.2; 180/65.1; 180/65.3; 180/65.4; 180/65.8; 322/8; 322/23; 322/38; 322/39; 320/103; 320/104; 320/121; 701/22
(58) Field of Search ................................ 318/139, 140, 318/153; 180/65.2, 65.4, 65.1, 65.3, 65.8; 322/8, 23, 38, 39; 701/22; 320/103, 104, 121; 364/481

(56) References Cited

U.S. PATENT DOCUMENTS

| | | | |
|---|---|---|---|
| 5,212,431 A | | 5/1993 | Origuchi et al. |
| 5,550,445 A | * | 8/1996 | Nii ................................ 318/153 |
| 5,619,417 A | * | 4/1997 | Kendall ........................ 364/483 |
| 5,650,931 A | * | 7/1997 | Nii ........................ 364/424.026 |
| 5,751,137 A | * | 5/1998 | Kiuchi et al. ................... 322/14 |
| 5,785,138 A | * | 7/1998 | Yoshida ...................... 180/65.2 |
| 5,879,062 A | * | 3/1999 | Koga et al. .................. 303/152 |
| 5,898,282 A | * | 4/1999 | Drozdz et al. ............... 318/139 |
| 5,908,453 A | * | 6/1999 | Tabata et al. .................. 701/22 |
| 5,909,094 A | * | 6/1999 | Yamada et al. .............. 318/140 |
| 5,941,328 A | * | 8/1999 | Lyons et al. ................ 180/65.1 |
| 5,984,033 A | * | 11/1999 | Tamagawa et al. ........ 180/65.2 |
| 6,116,363 A | * | 9/2000 | Frank .......................... 180/65.2 |
| 6,122,587 A | * | 9/2000 | Takahara et al. .............. 701/78 |
| 6,137,250 A | * | 10/2000 | Hirano et al. ............... 318/376 |
| 6,260,644 B1 | * | 7/2001 | Otsu .......................... 180/65.3 |
| 6,318,487 B2 | * | 11/2001 | Yanase et al. ............. 180/65.2 |

FOREIGN PATENT DOCUMENTS

| | | | |
|---|---|---|---|
| EP | 0645278 | 3/1995 | |
| JP | 06-197406 | 7/1994 | |
| JP | 07-115708 | 5/1995 | |
| JP | 10-178703 | 6/1998 | |
| JP | 11-041714 | * 2/1999 | ........... B60L/15/20 |
| JP | 11-103503 A | 4/1999 | |
| JP | 11-136808 | 5/1999 | |

* cited by examiner

*Primary Examiner*—Robert E. Nappi
*Assistant Examiner*—Tyrone Smith

(57) ABSTRACT

A generation control device of a hybrid electric vehicle is able to satisfactorily generate power with an excellent responsiveness with respect to a high output requirement from a motor. If a charge level SOC sensed by a charge level sensing device is not greater than a generation start value SOCsta, a generator starts a normal output generation (P(G)=P1). The normal output generation is continued until the charge level SOC reaches a generation end value SOCend larger than the generation start value SOCsta. If a required power consumption Pm of a traction motor sensed by a required power consumption sensing device is not less than Ph, a high output generation (P(G)=P2) with a higher output than the normal output generation is executed instead of the normal output generation.

17 Claims, 6 Drawing Sheets

GENERATION CONTROL DEVICE OF HYBRID ELECTRIC VEHICLE

Applicant's hereby claim the right of priority, under 35 U.S.C. §119, based on Japanese Application No. 2000-047433, filed on Feb. 24, 2000, the entire contents of which are hereby incorporated by reference.

BACKGROUND OF THE INVENTION

1. Field of the Invention

The present invention generally relates to a hybrid electric vehicle and more particularly to a generation control technique for a hybrid electric vehicle.

2. Description of Related Art

In recent years, there has been developed a series hybrid vehicle, equipped with a motor as a source of driving force for the vehicle and a secondary battery, which supplies power to the motor, charged by a generator driven by a relatively-small engine. Normally, the series hybrid vehicle operates the engine to run the generator in order to charge the battery if a charging level (SOC: state of charge) of the battery is low.

In this series hybrid type vehicle, however, a large amount of battery power may be consumed and rapidly lowers the charging level (SOC) of the battery if a motor is required to supply a high output, as in the case where a vehicle is running on an uphill slope or accelerating rapidly. In this case, the charging is delayed even if the generator is operated.

To address this problem, Japanese Patent Provisional Publication No. 11-103503, for example, discloses changing the generated power of a generator and the charged power of the battery according to the rate of change $\Delta SOC$ of a battery remaining capacity to thereby stabilize the charge state of the battery.

According to the above publication, the rate of change $\Delta SOC$ of the battery remaining capacity is detected. Thus, if the motor requires a high output, the power generated by the generator does not increase until the power of the battery is once used and lowers the charging level of the battery. More specifically, the generated power does not increase until a certain period of time has passed from a high output requirement from the motor.

If there is a delay from the time when the high output from the motor is required to the time when the battery is charged, the charge of the battery is significantly decreased and cause a deep discharge until the increase in the generated power is corrected. During this period, it is impossible to achieve a desired motor output according to the high output requirement. This is undesirable because a driver feels a sense of incongruity.

Moreover, the deep discharge may deteriorate the charging and discharging efficiency of the battery.

SUMMARY OF THE INVENTION

It is therefore an object of the present invention to provide a generation control device of a hybrid electric vehicle, which is able to satisfactorily generate power with an excellent responsiveness with respect to a high output requirement from a motor.

The above object can be accomplished by providing a hybrid electric vehicle comprising: a battery; a generator being rotated by a driving force of an engine to generate power to charge the battery; a traction motor being run by power of the battery; a required power consumption sensing device for sensing a required power consumption of the traction motor; a charge level sensing device for sensing a charge level of the battery; and a generated power control device that starts a normal output generation by said generator if the charge level sensed by the charge level sensing device is not greater than a generation start value, continues the normal output generation until the charge level reaches a generation end value larger than the generation start value, and performs a high output generation with a higher output than in the normal output generation regardless of the charge level sensed by the charging level sensing device if the required power consumption sensed by the required power consumption sensing device is not less than a set value.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

Preferred embodiments of the present invention will be described hereinbelow.

Figure 1:
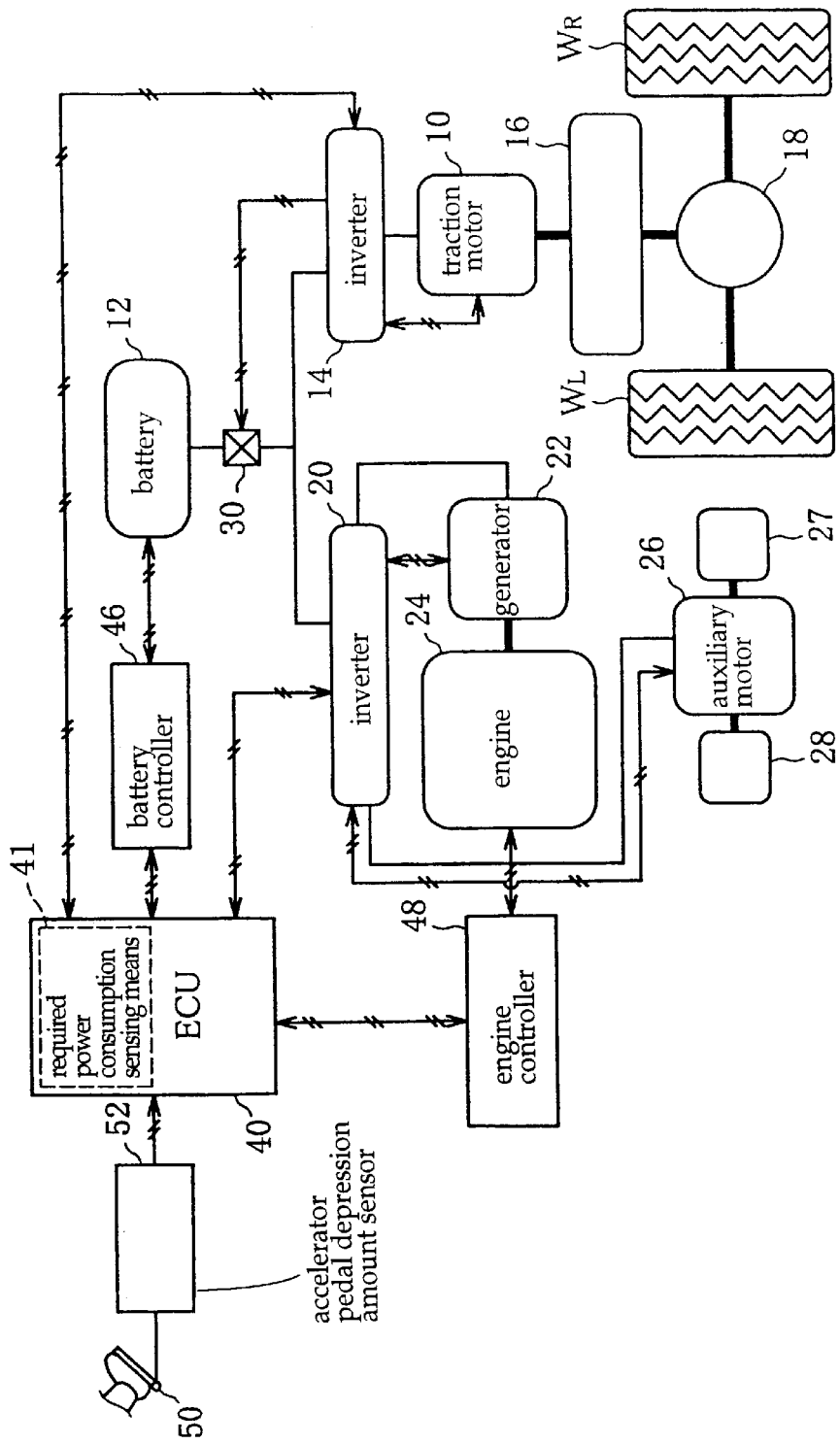
FIG. 1 is a schematic block diagram showing a series hybrid vehicle, to which a generation control technique for a hybrid electric vehicle according to the present invention is applied.

FIG. 1 is a schematic block diagram showing a series hybrid vehicle, to which a generation control device of a hybrid electric vehicle according to the present invention is applied. With reference to FIG. 1, the structure of the generation control device of the hybrid electric vehicle according to the present invention will now be described. For example, a large vehicle such as an omnibus, which runs at a low speed in a city, can be the series hybrid vehicle.

As shown in FIG. 1, the series hybrid vehicle is equipped with a traction motor 10 as a source of driving force. The traction motor 10 is electrically connected to a high-voltage secondary battery 12, which is used for running the traction motor 10, through an inverter 14. The traction motor 10 is, e.g., an induction motor, but may also be a permanent electromagnet synchronous type motor.

When the vehicle is braked, the traction motor 10 functions as an energy regenerative brake, i.e., a generator that utilizes braking energy. More specifically, when a driver of the vehicle operates a brake (not shown), the traction motor 10 generates a braking force and power at the same time. The generated power is charged in the battery 12. The inverter 14 supplies stable power to the traction motor 10 by adjusting voltage and current supplied from the battery 12 or a later-described generator 22, or supplies stable power to the battery 12 by adjusting voltage and current generated by the traction motor 10.

As shown in FIG. 1, a pair of driving wheels WR, WL is connected to a rotary shaft of the traction motor 10 through reduction gears 16 and a differential gear 18. The reduction gears 16 do not necessarily have to be provided. The battery 12 and the inverter 14 are electrically connected to the generator 22 through the other inverter 20. A rotary shaft of the generator 22 is connected to an output shaft of an engine 24, which is an internal combustion engine for driving the generator 22. The generator 22 is, i.e., a permanent electromagnet type generator.

The inverter 20 is also electrically connected to an auxiliary motor 26, which drives auxiliary units such as an air compressor 27 for an air brake and a power steering pump 28. As is the case with the inverter 14, the inverter 20 supplies stable power to the battery 12 or the traction motor 10 by adjusting voltage and current generated by the generator 22, or supplies stable power to the auxiliary motor 26 by adjusting the voltage and the current from the battery 12. The inverter 20 also has a function of adjusting the voltage and the current from the battery 12 and supplying them to the generator 22.

A relay fuse 30 is mounted between the battery 12 and the inverters 14, 20. The relay fuse 30 is electrically connected to the inverter 14. In accordance with information from the inverter 14, the relay fuse 30 allows a current to flow from the battery 12 to the traction motor 10, prevents an excessive current from flowing from the battery 12 to the traction motor 10 in accordance with information from the inverter 14, and prevents the generator 22 or traction motor 10 during the regenerative braking (the engine regeneration) from excessively charging the battery 12.

As shown in FIG. 1, the battery 12 and the inverters 14, 20 are electrically connected to an electronic control unit (ECU) 40 so that the battery 12 and the inverter 14, 20 can communicate with the ECU 40. The inverter 14 and the inverter 20 are electrically connected to the traction motor 10 and the generator 22, respectively, so that they can communicate with one another. The ECU 40 is connected to a battery controller 46, which monitors a charge level (SOC: state of charge), etc. of the battery 12, and an engine controller 48, which controls the operation of the engine 24.

The receiving side of the ECU 40 is connected to an accelerator pedal 50 that transmits one output requirement from a driver to the traction motor 10. The receiving side of the ECU 40 is also connected to an accelerator pedal depression amount sensor 52 that senses a control input θacc of the accelerator pedal 50. In accordance with the control input θacc sensed by the accelerator pedal depression amount sensor 52, a required power consumption sensing device 41 in the ECU 40 calculates a required power consumption Pm. A relationship between the control input θacc of the accelerator pedal 50 and the required power consumption Pm is preset on a map or the like.

In the hybrid vehicle constructed in the above-mentioned manner, a required motor torque signal corresponding to the control input θacc of the accelerator pedal 50 is supplied to the inverter 14 while the vehicle is running. In accordance with the signal, the inverter 14 adjusts the voltage and the current from the battery 12, and therefore, the traction motor 10 generates a desired motor torque. If the battery controller 46 senses a drop in SOC of the battery 12, the engine controller 48 starts the engine 24 to operate the generator 22, which generates power to charge the battery 12 in accordance with SOC. The generator 22 has a normal output generation mode and a high output generation mode as described later in further detail.

If, for example, a brake pedal (not shown) is operated to brake the vehicle, the traction motor 10 performs the regenerative braking and generates power to charge the battery 12. While the vehicle is running, the power from the battery 12 appropriately runs the auxiliary motor 26 in order to drive the auxiliary units such as the compressor 27 and the power steering pump 28.

Figure 2:
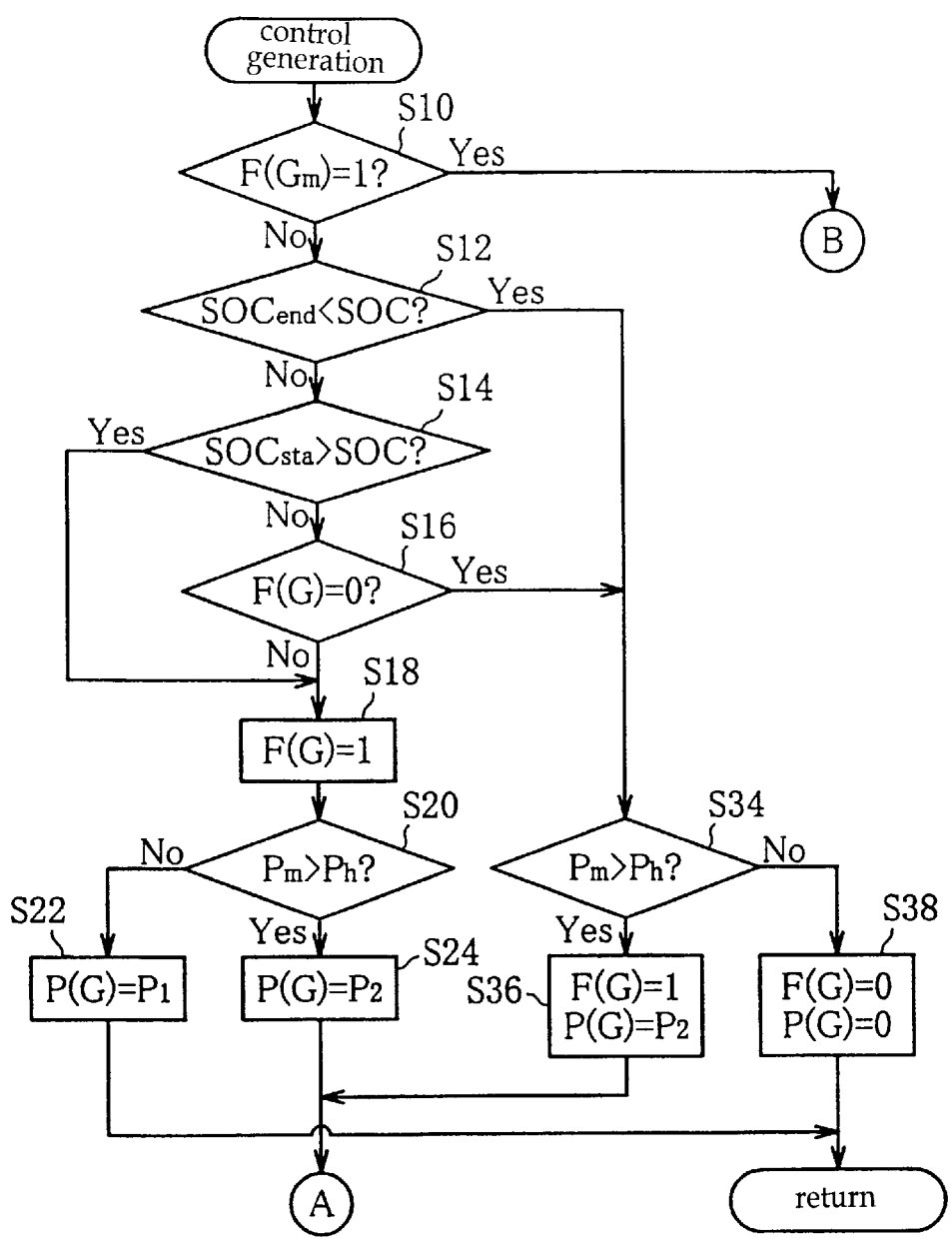
FIG. 2 is a flow chart showing a part of a generation control routine according to the present invention.
Figure 3:
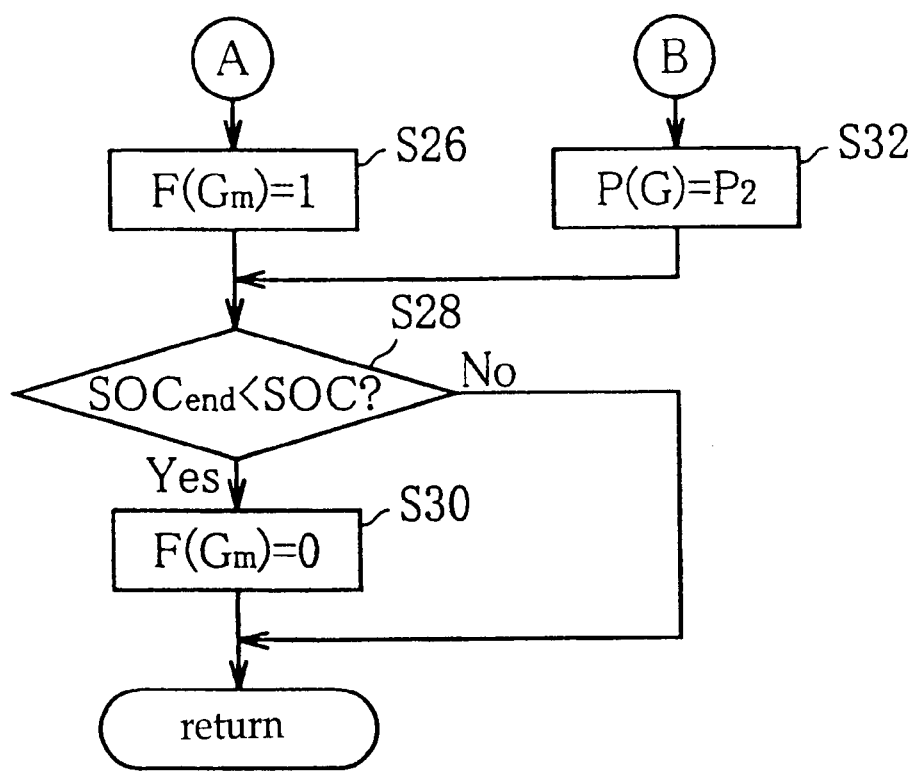
FIG. 3 is a flow chart showing the remaining part of the generation control routine continued from FIG. 2 according to the present invention.
Figure 4:
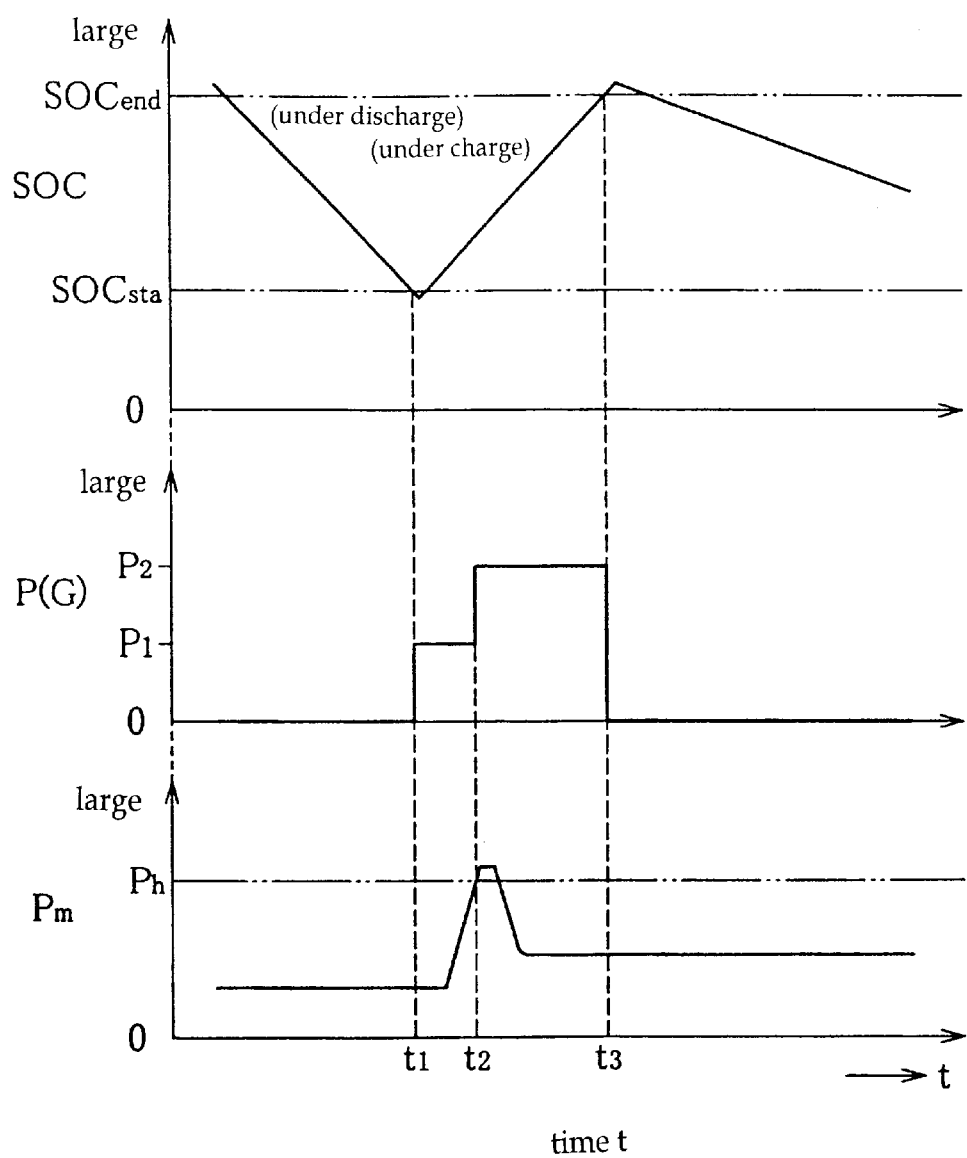
FIG. 4 is a time chart showing an example of the results of the generation.

As stated above, the series hybrid type vehicle has the normal output generation mode and the high output generation mode. The operation of the generation control device of the hybrid type vehicle according to the present invention, i.e., the generation control technique for the engine 24 will now be described hereinafter. FIGS. 2 and 3 are flow charts showing a generation control routine executed by the ECU 40 according to the present invention (a generation power control device). FIG. 4 is a time chart showing an example of the results of the generation control. Referring to FIG. 4, the generation control procedure along the flow charts of FIGS. 2 and 3 will now be described.

In step S10 in FIG. 2, it is determined whether the value of a later-described control flag F (Gm) is 1 or not. Since the initial value of the control flag F (Gm) is 0, the process goes to step S12. In step S12, it is determined whether the SOC of the battery 12 is higher than a generation end charge level (a generation end value) SOCend (e.g., 80% of the total SOC). If NO, i.e., the SOC is determined as being not greater than the generation end charge level SOCend, the process goes to a step S14.

In step S14, it is determined whether the SOC is lower than a generation start charge level (a generation start value) SOCsta (e.g., 75% of the total SOC). If YES, i.e., the SOC is determined as being lower than the generation start charge level SOCsta (a timing t1 in FIG. 4), the process goes to step S18. If the SOC is determined as being lower than the generation start charge level SOCsta, it can be considered that it is necessary to charge the battery 12, i.e., it is necessary for the generator 22 to generate the power. Therefore, in step S18, a generation flag F (G) is set to 1 to memorize that the generator 22 generates the power.

In the next step S20, it is determined whether a required power consumption (Pm) of the traction motor 10 is larger than a set value Ph (a first predetermined value) or not. In other words, it is determined whether the power required for the traction motor 10 is large or not because, e.g., the vehicle is running on an uphill or is rapidly accelerating. If NO, i.e., the required power consumption Pm is determined as being not greater than the set value Ph, in other words, if the traction motor does not require a large quantity of power as in the case where the vehicle is normally running on a flat road, the process goes to step S22.

In step S22, the generator 22 generates the power while the engine 24 is controlled so that a generated power quantity P (G) can be a predetermined power value P1 corresponding to a normal output generation (timings t1–t2 in FIG. 4). More specifically, if the required power consumption Pm of the traction motor 10 is not greater than the set value Ph, the power is generated with a normal output. If the normal output generation is executed, the charged amount in the battery 12 increases so that the SOC can reach the generation start charging level SOCsta. If the SOC reaches the generation start charging level SOCsta, the determination result of the step S14 is NO. The process then goes to step S16.

In step S16, it is determined whether the value of the generation flag F(G) is 0 or not. More specifically, it is determined whether the SOC is decreasing (F(G)=0) since the power is being discharged without the power generation or the SOC is increasing (F(G)=1) since the power is being charged due to the power generation. Since the value of the generation flag F (G) is set to 1 in step S18, the determination result is NO and the SOC is increasing. The process goes to step S20 again via step S18.

If the determination result in step S20 is NO and the required power consumption Pm of the traction motor 10 is still not greater than Ph, the normal output generation is continued. On the other hand, the process goes to step S24 if the power required for the traction motor 10 is rapidly increased and the determination result in the step S20 is YES, i.e., the required power consumption Pm is determined as being not less than the set value Ph.

If the required power consumption Pm is larger than the set value Ph, it can be determined that the power of the battery 12 is being rapidly consumed. Thus, in step S24, the generator 22 generates the power while the engine 24 is controlled so that the generated power P (G) can be a predetermined power value P2 corresponding to the high output generation with a higher output than the normal output generation (a timing t2 in FIG. 4). More specifically, if the required power consumption Pm of the traction motor 10 is larger than the set value Ph, the high output generation is executed so that the battery 12 can be charged rapidly with an excellent responsiveness.

This prevents the deep discharge, i.e. the rapid discharge of the battery 12 and satisfactorily increases the SOC of the battery 12 as is the case with the normal output generation even if the power of the battery 12 is rapidly consumed. More specifically, the charge and the discharge can be controlled efficiently while the SOC is prevented from becoming substantially lower than the generation start charging level SOCsta.

At the start of the high output generation, the process goes to step S26 in FIG. 3. In the step S26, the control flag F (Gm) is set at 1 to memorize the fact that the high output generation is being executed. Then, the process goes to step S28. In step S28, whether the SOC exceeds the generation end charging level SOCend or not is determined according to the increase in the SOC. If no, i.e., it is determined that the SOC is still not greater than the generation end completion level SOCend, the determination result is YES next time the routine is executed since the control flag F (Gm) is set at 1 in step S10. In this case, the process goes to step S32 to continue the high output generation with the generated power P (G) being maintained at a predetermined power value P2 (timings t2–t3 in FIG. 4).

On the other hand, if the determination result in step S28 is YES and the SOC is determined as being in excess of the generation end charge level SOCend, it is unnecessary to charge the battery 12. Thus, the engine 24 is stopped so that the generator 22 can end the high output generation. In the next step S30, the control flag F (Gm) reset to 0 to memorize the end of the high output generation (a timing t3 in FIG. 4).

More specifically, once the high output generation is executed, the high output generation is continued until the SOC reaches the generation end charge level SOCend even if the required power consumption Pm is decreased to the set value Ph. More specifically, whether to stop the high output generation is determined according to the SOC. This prevents hunting of the high output generation and the normal output generation and charges the battery 12 more rapidly than in the normal output generation even if the required power consumption Pm is changed across the set value Ph.

If the engine 24 is controlled to stop with the SOC being in excess of the generation end charge level SOCend and the control flag F(Gm) is set at 0, the determination result in step S12 is YES the next time when the routine is executed. The process then goes to step S34. The process also goes to the step S34 in the case where the determination result in step S16 is YES, the generation flag F(G) is set at 0 and it is determined that the SOC is currently decreasing (F(G)=0).

As in the case with step S20, it is determined in step S34 whether the required power consumption Pm is larger than the set value Ph. The process goes to step S38 if the determination result is NO, i.e., the required power consumption Pm is determined as being not greater than the set value Ph, in other words, the traction motor 10 does not require a large amount of power. If the required power consumption Pm is not greater than the set value Ph, it can be considered that the SOC does not decrease rapidly. Thus, in step S38, the generation flag F(G) is set at 0 to memorize the fact that the generator 22 does not generate power. Accordingly, the generated power P(G) is set at 0.

If the determination result in step S34 is YES, i.e., the required power consumption Pm is determined as being greater than the set value Ph, the process goes to step S36. If the required power consumption Pm is larger than the set value Ph, it can be considered that the power of the battery 12 is being consumed rapidly. Thus, in step S36, the high output generation is executed even if the SOC is in excess of the generation end charge level SOCend and the SOC is currently decreasing. This prevents the deep discharge, i.e., the rapid discharge of the battery 12 to desirably maintain the SOC of the battery 12 even if the power of the battery 12 is rapidly consumed.

Upon the start of the high output generation in step S36, steps S26 through S32 are executed as stated previously. Therefore, while the SOC is decreasing, the high output generation continues until the SOC reaches the generation end charge level SOCend. Even if the require power consumption Pm is changed across the set value Ph, the hunting of the high output generation and the normal output generation can be prevented and the battery can be charged more rapidly than in the normal output generation.

Figure 5:
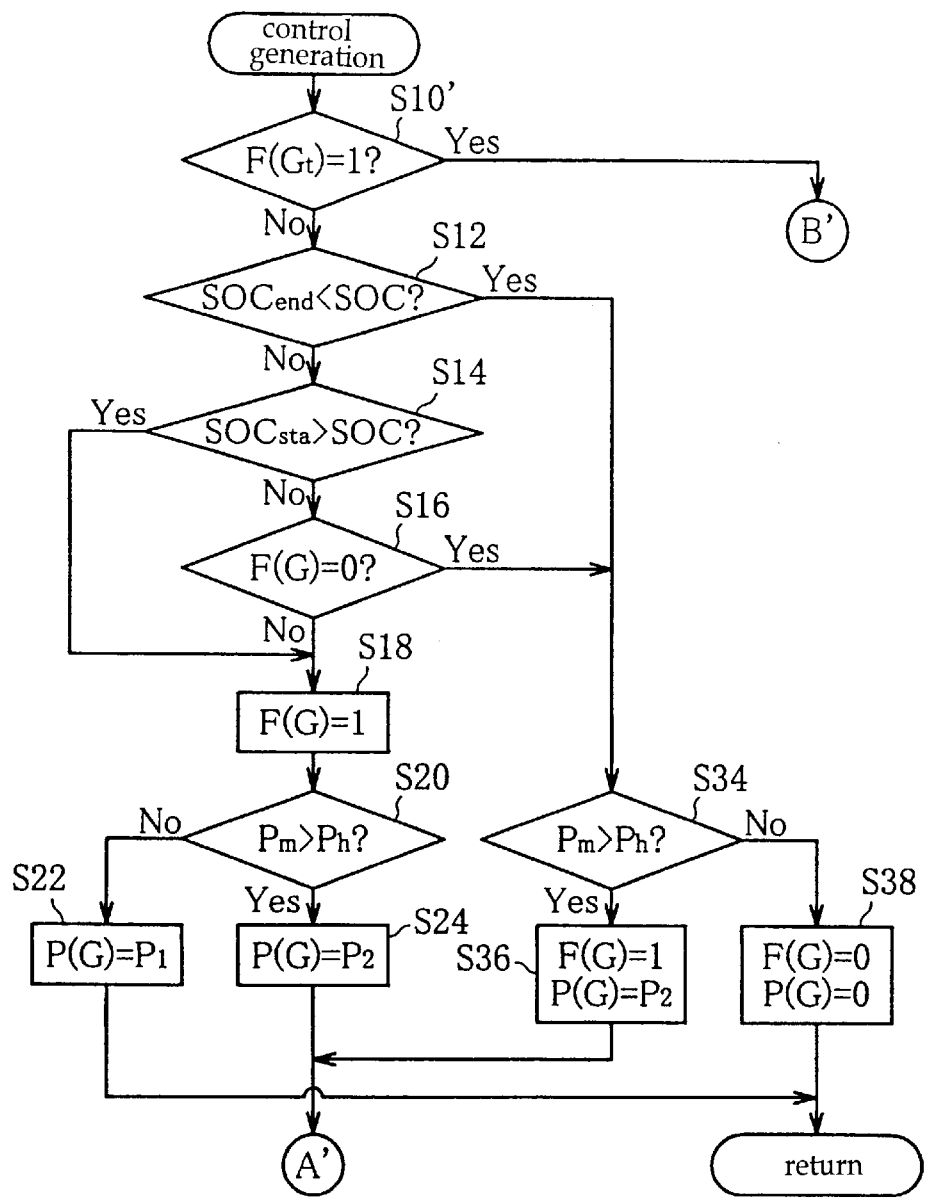
FIG. 5 is a flow chart showing a part of a generation control routine according to another embodiment of the present invention.
Figure 6:
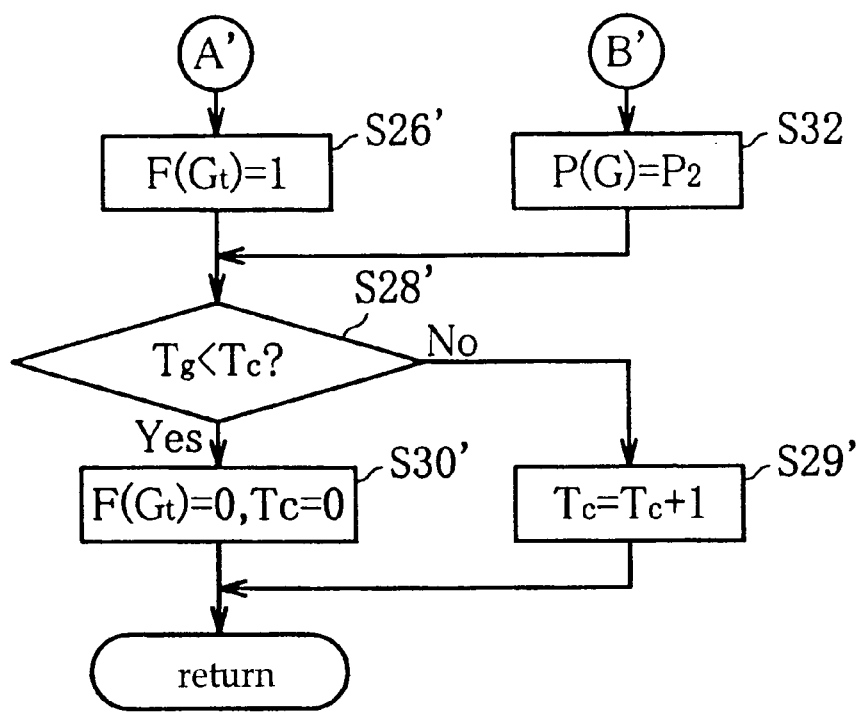
FIG. 6 is a flow chart showing the remaining part of the generation control routine continued from FIG. 5 according to the present invention.

There will now be described another embodiment. FIGS. 5 and 6 are flow charts showing a control routine according to another embodiment of the present invention. A description will hereunder be given with reference to the flow charts. According to the present embodiment, the generation is controlled basically in the same manner as in the above-described embodiment. A description will hereunder be given of portions different from those in FIGS. 2 and 3, i.e., parts related to steps S10', S26' through S30' denoted by the same reference numerals as those in FIGS. 2 and 3.

According to the present embodiment, the process goes to step S26' in FIG. 6 when the high output generation is started in step S24 or S36 in FIG. 5. In step S26', the control flag F(Gt) is set to 1 to memorize the fact that the high output generation is currently being executed. The process then goes to step S28'. In step S28', it is determined whether an elapsed time Tc from the start of the high output generation is in excess of a predetermined time Tg. If the determination result is NO and the elapsed time Tc is still within a predetermined time Tg, the process goes to step S29' to count up the elapsed time Tc (Tc=Tc+1). The process then returns to step S10'.

In this case, since the control flag F(Gt) is set to 1 due to the execution of step S26', the determination result in step S10' is YES. The process then goes to step S32 to continue the high output generation with the generated power P(G) being maintained at a predetermined power value P2.

If the determination result in step S28' is YES and the elapsed time is determined as being in excess of the predetermined time Tg, it is no longer necessary to charge the battery 12. Thus, the engine 24 is stopped to cause the generator 22 to end the high output generation. In next step S30', the control flag F(Gt) is set to 0 to memorize the end of the high output generation, and the elapsed time Tc is reset at 0 at the same time.

More specifically, once the high output generation is started, the high output generation continues until the elapsed time Tc reaches the predetermined time Tg even if the required power consumption Pm becomes not greater than the set value Ph. In short, whether the high output generation should be stopped or not is determined according to the elapsed time Tc. This prevents the hunting of the high output generation and the normal output generation and charges the battery 12 more rapidly than in the normal output generation even if the require power consumption Pm is changed across the set value Ph as is the case with the previously-described embodiment.

In the above embodiment, the elapsed time Tc is counted from the start of the high output generation, but the present invention should not be restricted to this. For example, the elapsed time Tc may be counted up from a point where the require power consumption Pm becomes smaller than the set value Ph (a second predetermined value) after the start of the high output generation, and the high output generation may be ended when the elapsed time Tc reaches the predetermined time Tg. In the above embodiments, there are the normal output generation mode and the high output generation mode, and the generated power P(G) is switched between the predetermined power value P1 and the predetermined power value P2 according to the required power consumption Pm. The present invention, however, should not be restricted to this. For example, in the high output generation mode, the generated power P(G) may be changed in multiple stages or linearly according to the required power consumption Pm. This realizes a more precise control of the generation.

In the above embodiments, the required power consumption Pm is found from the output of the accelerator pedal depression amount sensor 52, but the present invention should not be restricted to this. For example, the inverter 24 may sense the actual power consumption of the motor and utilize the sensed power consumption as the required power consumption.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A hybrid electric vehicle, comprising:
   a battery;
   a generator activated by driving force of an engine to generate power and charge said battery;
   a traction motor activated by power of said battery;
   a required power consumption sensing device for sensing a required power consumption for said traction motor;
   a charge level sensing device for sensing an actual charge level of said battery;
   a generated power control device which initiates a normal output generation by said generator if the charge level sensed by said charge level sensing device is not greater than a generation start value, and continues said normal output generation until the charge level reaches a generation end value larger than said generation start value, and initiates a high output generation with a higher output than in said normal output generation regardless of the charge level sensed by said charge level sensing device if the required power consumption sensed by said required power consumption sensing device is not less than a first predetermined value.

2. A hybrid electric vehicle according to claim 1, wherein said generated power control device continues said high output generation until the charge level sensed by said charge level sensing device reaches said generation end value.

3. A hybrid electric vehicle according to claim 1, wherein said generated power control device continues said high output generation for a predetermined period of time after said high output generation is initiated.

4. A hybrid electric vehicle according to claim 1, wherein said generated power control device continues said high output generation for a predetermined period of time after said required power consumption becomes smaller than a second predetermined value.

5. A hybrid electric vehicle according to claim 1, wherein said generated power control device executes said high output generation correspondingly to the required power consumption sensed by said required power consumption sensing device.

6. A hybrid electric vehicle, comprising:
   a battery;
   a generator activated by driving force of an engine to generate power and charge said battery;
   a traction motor activated by power of said battery;
   a required power consumption sensing device sensing a required power consumption for said traction motor;
   a charge level sensing device for sensing an actual charge of said battery;
   a generated power control device for executing one of a normal output generation mode in which said generator performs a normal output generation if the charge level sensed by said charge level sensing device is not greater than a generation start value, and a high output generation mode in which said generator performs a high output generation with a higher output than in said normal output generation regardless of the charge level sensed by said charge level sensing device if the required power consumption sensed by said required power consumption sensing device is not less than a first predetermined value.

7. A hybrid electric vehicle according to claim 1, wherein said required power consumption sensing device is an accelerator pedal depression amount sensor.

8. A hybrid electric vehicle according to claim 6, wherein said required power consumption sensing device is an accelerator pedal depression amount sensor.

9. A hybrid electric vehicle according to claim 6, wherein said generated power control device continues said high output generation until the charge level sensed by said charge level sensing device reaches said generation end value.

10. A hybrid electric vehicle according to claim 6, wherein said generated power control device continues said high output generation for a predetermined period of time after said high output generation is initiated.

11. A hybrid electric vehicle according to claim 6, wherein said generated power control device continues said high output generation for a predetermined period of time after said required power consumption becomes smaller than a second predetermined value.

12. A hybrid electric vehicle according to claim 6, wherein said generated power control device executes said high output generation correspondingly to the required power consumption sensed by said required power consumption sensing device.

13. A method recharging a battery in a hybrid electric vehicle having a battery, a generator activated by a driving force of an engine to charge the battery, a traction motor activated by power from the battery, comprising:

detecting a required power consumption for the traction motor;

detecting an actual charge level of the battery;

initiating a normal output generation by the generator if the detected actual charge level is not greater than a generation start value, and continuing the normal output generation until the detected actual charge level reaches a generation end value greater than the generation start value; and initiating a high output generation with a higher output than in the normal output generation regardless of the detected actual charge level if the detected required power consumption is not less than a first predetermined value.

14. The method according to claim 13, wherein said initiating a high output generation step includes the step of, continuing the high output generation until the detected actual charge level reaches the generation end value.

15. The method according to claim 13, wherein said initiating a high output generation step includes the step of, continuing the high output generation for a predetermined period of time after initiation of the high output generation.

16. The method according to claim 13, wherein said initiating a high output generation step includes the step of, continuing the high output generation for a predetermined period of time after the detected required power consumption becomes smaller than a second predetermined value.

17. The method according to claim 13, wherein said initiating a high output generation step includes the step of, executing the high output generation correspondingly to the detected required power consumption.

\* \* \* \* \*